United States Patent [19]

Tolentino

[11] 4,382,057
[45] May 3, 1983

[54] SILICONE RUBBER COMPOSITIONS FOR LIQUID INJECTION MOLDING MACHINES

[75] Inventor: Luisito A. Tolentino, Ballston Lake, N.Y.

[73] Assignee: General Electric Company, Waterford, N.Y.

[21] Appl. No.: 327,697

[22] Filed: Dec. 4, 1981

[51] Int. Cl.³ .............................................. B28B 1/24
[52] U.S. Cl. .................... 264/328.2; 264/328.4; 528/15; 528/31; 528/32; 524/448; 524/588; 524/789; 524/791; 524/862
[58] Field of Search ................... 264/328.2, 328.4; 528/15; 524/789, 791, 862, 448, 588

[56] References Cited

U.S. PATENT DOCUMENTS

| | | | |
|---|---|---|---|
| 2,938,009 | 5/1960 | Lucas | 260/37 |
| 3,159,601 | 12/1964 | Ashby | 260/46.5 |
| 3,159,662 | 12/1964 | Ashby | 260/448.2 |
| 3,220,972 | 11/1965 | Lamoreaux | 260/46.5 |
| 3,419,593 | 12/1968 | Willing | 260/448.2 |
| 3,436,366 | 4/1969 | Modic | 260/37 |
| 3,445,420 | 5/1969 | Kookootsedes et al. | 260/37 |
| 3,516,946 | 6/1970 | Modic | 252/429 |
| 3,635,743 | 1/1972 | Smith | 106/288 Q |
| 3,775,452 | 11/1973 | Karstedt | 260/429 R |
| 3,882,083 | 5/1975 | Berger | 260/46.5 UA |
| 4,029,629 | 6/1977 | Jeram | 260/37 SB |
| 4,041,010 | 8/1977 | Jeram | 260/42.26 |
| 4,061,609 | 12/1977 | Bobear | 260/9 |
| 4,256,870 | 3/1981 | Eckberg | 528/15 |

*Primary Examiner*—Melvyn I. Marquis
*Attorney, Agent, or Firm*—E. Philip Koltos; John L. Young; Gary L. Loser

[57] ABSTRACT

A SiH-olefin platinum catalyzed composition having a Durometer Hardness of at least 60 where the novel ingredients are a combination of 10 to 50 parts by weight of fumed silica and 5 to 50 parts by weight of calcined diatomaceous earth per 100 parts of the base vinyl-containing compound. Such a composition is useful for forming molded parts in liquid injection molding machines, both of the plunger type and of the reciprocating screw type.

49 Claims, No Drawings

SILICONE RUBBER COMPOSITIONS FOR LIQUID INJECTION MOLDING MACHINES

BACKGROUND OF THE INVENTION

The present invention relates to silicon rubber compositions, and more particularly, the present invention relates to silicone rubber compositions which are suitable for liquid injection molding machines.

One type of composition that forms silicone elastomers is a SiH-olefin platinum catalyzed composition. Such compositions comprise as their basic ingredients a vinyl-containing polysiloxane, a hydride cross-linking agent which may be a hydride resin or a linear hydride-containing polysiloxane and a platinum catalyst. There are various types of platinum catalysts that can be utilized and particularly the solubilized platinum complex catalysts. The composition is packaged such that the hydride is kept separate from the vinyl polymer. The platinum is packaged with the vinyl polymer. Since there is no single package in which all three ingredients are present, the composition is stable. However, when all three ingredients are mixed, and in the absence of an inhibitor, the composition cures to a silicone elastomer at room temperature. Such compositions are for instance disclosed in Modic U.S. Pat. No. 3,436,366, which is hereby incorporated by reference.

There may be incorporated into such composition various types of inhibitors such as hydroperoxide-containing compounds, alkenyl maleates, allylisocyanurates, acetylenic alcohols and other types of inhibitors. These inhibitors generally allow the composition to have an appropriate or desirable work life and pot life at room temperature. However, when the composition is heated at elevated temperatures, that is, temperatures above 100° C., the inhibitor decomposes and the composition cures in a matter of minutes or even in a matter of seconds to a silicone elastomer. In some cases, it may be desirable to post-bake the composition so as to complete the cure. Such compositions are also known in which the basic components contain fluorine substitution as disclosed in Jeram U.S. Pat. Nos. 4,041,010 and 4,029,629 which are hereby incorporated by reference. The advantages of such fluoro-substituted silicone compositions is that the composition has good solvent resistance.

These compositions disclosed above may contain various types of fillers including reinforcing fillers such as fumed silica and precipitated silica and also extending fillers such as lithopone, zinc oxide, diatomaceous earth, glass fibers, etc.

Proceeding to a related subject, there were developed injection moldimg machines for the fabrication of small plastic parts at a rapid rate. These liquid injection molding machines were capable of producing a large number of platic parts in a very small time period, and substantially eliminating much of the labor involved in the manufacture of such parts. As a result, the cost of the production of such plastic parts dramatically decreased. In accordance with this development of liquid injection molding machines, it became desirable to develop silicones for utilization in such liquid injection molding machines. An example and modification of liquid injection molding machines both of the plunger or ram type and of the reciprocating screw type is to be for instance found in the disclosures of Laghi, Ser. Nos. 159,262, 183,620. These patent applications disclose modifications that can be made to standard liquid injection molding machines such that they can handle liquid silicone compositions. Accordingly, such machines would take liquid silicone, force it into the barrel of the liquid injection molding machine under pressure, and then the machine would force a shot or volume of silicone into a mold and the mold would be heated. Upon heating, the silicone composition in the mold would cure to a silicone elastomer in a matter of seconds. The mold would then open and the part was automatically ejected. It was found that the most suitable silicone compositions for such liquid injection molding machines were the SiH-olefin platinum catalyzed type as described above, and particularly types that were developed to meet the requirements of the liquid injection molding industry. Accordingly, one type of part for which silicone compositions were desirable were electrical connectors. For such electrical connectors it was desirable that the cured silicone part had certain properties. Thus, it was desirable the cured elastomer have a Tensile Strength in the neighborhood of 800 to 1000 psi, an Elongation above 200, and more preferably in the range of 200–400%, a Tear above 100 pi and a Durometer Shore A Hardness above 60. Especially desirable in the case of electrical connectors was that the Durometer of the cured composition be above 60 and there be an Elongation of at least 200% prior to post-bake.

Accordingly, such a composition was formulated for liquid injection molding machines to make certain types of electrical connectors. It was also desirable in such a composition that the uncured composition have a viscosity that was not above $1.5 \times 10^6$ centipoise at 25° C. When the viscosity of the uncured composition was above this point, then the composition could not be injected or utilized in the liquid injection molding machine with facility; that is, the high viscosity composition would flow with difficulty into the mold, and a good molded part would not always be formed. Accordingly, such compositions were formulated in which there was obtained the foregoing Elongation and Durometer Hardness by using fumed silica as a reinforcing filler and ground quartz as the extending filler. The fumed silica imparts Hardness and increases the Tensile Strength, Elongation and Tear Strength while ground quartz imparts to the composition hardness. Further, the ground quartz was an inexpensive filler. However, it was found that such a filler had poor wearing effects on the mold. It resulted in an electrical connector that was abrasive. As a result, the abrasive silicone composition would wear out the mold such that after about two weeks continuous running or so of the mold, the liquid silicone composition would wear out a portion of the mold.

Accordingly, it became highly desirable to find a substitute for ground quartz. However, the insertion of plasticizers into the composition was not desirable; that is, traditional plasticizers that had been inserted into silicone compositions for maintaining the elongation of the composition, while at the same time reducing the abrading properties of the cured silicone composition were not found to be acceptable in the instant case. Such plasticizers such as linear diorganopolysiloxane fluids would decrease the Durometer of the cured composition which was not acceptable. Accordingly, it became highly desirable to find an ingredient or a filler for SiH-olefin platinum catalyzed compositions which could be substituted for the ground quartz and would not deleteriously affect the desired physical properties of the composition, that is, Durometer, Elongation, Tensile Strength, and Tear.

Accordingly, it was highly unexpected to find that calcined diatomaceous earth in certain concentrations in combination with fumed silica would give a desirable cured silicone elastomeric product in a liquid injection molding machine.

Accordingly, it is one object of the present invention to provide for a combination of fumed silica and diatomaceous earth in a liquid injection molding composition wherein the cured part has a Durometer Hardness of at least 60.

It is an additional object of the present invention to provide for an SiH-olefin platinum catalyzed composition that has a Durometer of at least 60, an Elongation of at least 200%, and which composition is not abrasive.

It is still an additional object of the present invention to provide for a liquid injection molding composition which has low abrasive properties in the cured state and good mold release properties and has acceptable physical properties for use in electrical connectors.

It is yet an additional object of the present invention to provide a process for operating a liquid injection molding machine of either the plunger type or the reciprocating screw type with a liquid silicone composition which cures to a silicone elastomer with the required physical properties.

It is still a further object of the present invention to provide a process for producing a cured part from a liquid silicone composition in a liquid injection molding machine wherein the silicone composition does not abrade the mold and wherein the cured silicone part has the desired physical properties such as a Durometer Hardness of at least 60 and an Elongation of at least 200%.

These and other objects of the present invention are accomplished by the disclosures set forth herein below.

SUMMARY OF THE INVENTION

In accordance with the above objects there is provided by the present invention, a silicone rubber composition which in the uncured state does not have a viscosity that exceeds $1.5 \times 10^6$ centipoise at 25° C. and has a Durometer in the cured state that exceeds 60 comprising:
(A) 100 parts by weight of a linear vinyl-terminated diorganopolysiloxane polymer having a viscosity that is in the range of 100 to 100,000 centipoise at 25° C. where the organo is a monovalent hydrocarbon radical and the vinyl content varies from 0.05 to 0.20 weight percent;
(B) from 10 to 50 parts by weight of fumed silica;
(C) from 5 to 50 parts by weight of a calcined diatomaceous earth;
(D) from 1 to 200 parts per million of platinum as a platinum catalyst; and
(E) from 1 to 50 parts by weight of a hydride organopolysiloxane cross-linking agent where the hydrogen content varies from 0.2 to 1.0 percent by weight where the organo group is a monovalent hydrocarbon radical.

The cross-linking agent can be either hydride resin composed of monofunctional and tetrafunctional units, or a hydride resin composed of monofunctional, difunctional and tetrafunctional units or it can be a linear hydride-containing polysiloxane polymer. Also, either the vinyl-containing base polymer or the hydride polysiloxane can contain fluorine substitution such as 3,3,3-trifluoropropyl. It is envisioned that the term monovalent hydrocarbon radical in the instant claims and specification cover such fluorine substituted radicals.

The platinum catalyst can be any platinum catalyst, but is preferably a solubilized platinum complex since the rate of reaction is the most rapid with such catalysts. Also, there may be in the composition an inhibitor, the most preferred being the hydroperoxide containing compounds, and alkenyl maleates. The novel composition of the instant case has in it a certain combination of fumed silica which is preferably treated with cyclopolysiloxanes and/or silazanes in combinations with a certain concentration of diatomaceous earth. There are other preferable ingredients in the composition, as will be explained below, in order to obtain the maximum desired properties in the composition.

Generally, it is desired that the electric connector or electrical part produced by the liquid injection molding composition and process of the instant case have a Tensile Strength of in the neighborhood of 800 to 1,000 psi, a Durometer of above 60, an Elongation of at least 200% and preferably 300 to 400% and a Tear above 100. The present liquid injection molding composition can be utilized either in a ram type of liquid injection molding machine or reciprocating screw type of liquid injection molding machine. The present case covers both the novel composition of the instant case as well as the process for producing it and the process for utilizing it in a liquid injection molding machine.

DESCRIPTION OF THE PREFERRED EMBODIMENT

The basic composition comprises a composition that has a viscosity in the uncured state that does not exceed $1.5 \times 10^6$ and in the cured stated has a Durometer that exceeds 60. Preferably the Elongation prior to postbake exceeds 200%. The uncured viscosity is desirable in that the composition will not easily flow in a mold even when heated to elevated temperatures if it is above the viscosity indicated above. Accordingly, the viscosity limitation is a limitation that must be met if the composition is going to be used for liquid injection molding machines. As pointed out previously, the present composition can be utilized both in the plunger type of liquid injection molding machines as well as the reciprocating screw liquid injection molding machines as modified for utilization of liquid silicone composition.

The basic ingredient in the present composition comprises 100 parts by weight of a linear vinyl-terminated diorganopolysiloxane polymer having a viscosity that is in the range of 100 to 100,000 centipoise at 25° C. The upper viscosity limitation in the above definition is necessary so that the final mixed uncured composition will have the desired viscosity. It should be noted that the present base polymer can be a blend of two linear vinyl-terminated diorganopolysiloxane polymers wherein the blend of the two polymers has a viscosity in the range of 100 to 100,000 centipoise at 25° C. The blend can be in any proportions as long as the desired end viscosity is obtained. It should be noted that the organo group in the expression "diorganopolysiloxane polymer" is a monovalent hydrocarbon radical and generally, the polymer has a vinyl content that preferably varies from 0.05 to 0.20 weight percent. Preferably the linear vinyl-terminated polysiloxane polymer has the formula

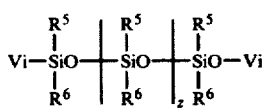
(1)

where Vi is vinyl, $R^6$ is a monovalent hydrocarbon radical and $R^5$ is a monovalent hydrocarbon radical free of aliphatic unsaturation and z varies such that the viscosity of the polymer varies from 100 to 100,000 centipoise at 25° C. In the most preferred embodiment, $R^6$, is also free of aliphatic unsaturation. The radicals $R^6$ and $R^5$ can be monovalent hydrocarbon radicals such as alkyl, such as methyl, ethyl, propyl, etc.; cycloalkyl radicals such as cyclohexyl, cycloheptyl, cyclooctyl, etc.; mononuclear aryl radicals such as phenyl, methylphenyl, ethylphenyl etc. The expression, "monovalent hydrocarbon radical" also includes fluoroalkyl radicals such as 3,3,3-trifluoropropyl. It should be noted that the expression $R^6$ can also include alkenyl radicals and alkynyl radicals such as vinyl, allyl, etc. Preferably, $R^6$ does not include such radicals as alkenyl and alkynyl radicals. The most important requisite of such a polymer is that it be a vinyl-terminated polymer and have a certain vinyl content in order to produce a polymer with proper physical properties and in order to cure at a sufficiently fast rate in the liquid injection molding machine.

It should be noted that these polymers are easily produced and generally comprise taking the appropriate cyclotetrasiloxanes and equilibriating them or reacting them in the presence of vinyl-terminated, low molecular weight linear polymers such as divinyltetramethyl disiloxane, in the presence of an alkali metal hydroxide catalyst. After a sufficient amount of the linear polymers is formed, the catalyst is neutralized and the unreacted cyclics vented off to give the desired polymer. The chain-stopper is generally obtained by the hydrolysis of the appropriate chlorosilanes. For more information as to the production of such polymers, please refer to U.S. Pat. Nos. 4,041,010 and 3,436,366 and the patents referred to therein.

As noted above previously, the base vinyl containing polymer can be a blend of such polymers, it is only desirable that the viscosity of the blend be within the range indicated previously of 100 to 100,000 centipoise at 25° C., but more preferably in the range of 100 to 50,000 centipoise at 25° C. The next critical ingredient in the composition of the present invention is from 1 to 50 parts by weight of a hydride organopolysiloxane cross-linking agent per 100 parts by weight of the base polymer. Desirably, the hydride content of such a hydride cross-linking agent varies from 0.2 to 1.0 percent by weight where the organo group in the hydride organopolysiloxane is a monovalent hydrocarbon radical. The hydride organopolysiloxane can be of two parts. It can either be a hydride resin or it can be a linear hydride terminated organopolysiloxane polymer of low viscosity and low molecular weight.

Accordingly, a resinous hydride copolymer can be of

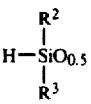

units and $SiO_2$ units where the $H+R^2$ to Si ratio varies from 1.0 to 2.7, and where $R^2$ is a monovalent hydrocarbon radical free of aliphatic unsaturation. It should be noted that the $R^2$ radical in the hydride resin can also be an aliphatic unsaturated radical. If that is the case, then the platinum catalyst cannot be mixed into it prior to use unless there is utilized a very effective inhibitor, otherwise the composition will cure up and the hydride cross-linking agent will cross-link with itself. Accordingly, it is more desirable that $R^2$ not be a radical having aliphatic unsaturation. However, $R^2$ can be any of the monovalent hydrocarbon radicals given previously for $R^6$ in the formula of the vinyl-terminated diorganopolysiloxane polymer. If the resin has the proper hydride content, then the hydride will cross-link with the vinyl-terminated polymer to form the desired cured elastomer of the desired physical properties. If the desired hydride content is not present, or the desired $H+R^2$ to Si ratio is not within the range as indicated above, then incomplete cure will take place or a cured elastomer with poor physical properties will be obtained. It should be noted that some of the $R^2$ radicals can also be selected from trifluoropropyl groups, or generally speaking fluoroalkyl groups of 3 to 8 carbon atoms.

The hydride resin can also be composed of

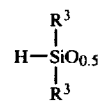

units and $SiO_2$ and $R_2{}^3SiO$ units where the $H+R^3$ ratio varies from 1.2 to 2.7 and where $R^3$ is a monovalent hydrocarbon radical free of aliphatic unsaturation. This resin differs in that it has difunctional siloxy units as well as monofunctional and tetrafunctional siloxy units. Again, it is preferred that the $R^3$ radical can be any monovalent hydrocarbon radical as given previously for the $R^6$ radical of the vinyl-terminated polymer of Formula (1) with the exception of aliphatically unsaturated radicals. As stated previously, with the previous hydride resin, some of the $R^3$ radicals can be aliphatically unsaturated radicals if a very effective inhibitor is utilized or the platinum catalyst is not mixed with the hydride. It must be noted again that if a hydride contains an aliphatically unsaturated radical and there is placed a platinum catalyst in contact with it, then the hydride resin will cross-link with itself to produce a silicone elastomer. It is desirable that the $R^3$ radical not cross-link with itself and, accordingly, it is necessary that it not contain aliphatically unsaturated radicals. These hydride resins are produced by methods well known in the art which generally comprise hydrolyzing the appropriate chlorosilanes in water with preferably a solvent, and then purifying the resultant hydrolyzates. This process is adequately explained in U.S. Pat. No. 4,041,010. As noted previously with the prior resin, some of the $R^3$ radicals can be fluoroalkyl radicals of 3 to 8 carbon atoms, such as 3,3,3-trifluoropropyl radicals.

Another hydride polysiloxane that can be utilized is a hydride linear organopolysiloxane copolymer having the formula

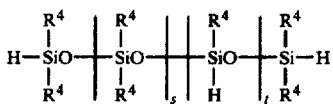

where t is 0 or a positive integer, and s and t vary such that the viscosity of the polymer varies from 10 to 1,000 centipoise at 25° C., and preferably varies from 10 to 100 centipoise at 25° C. The radical $R^4$ is a monovalent hydrocarbon radical free of aliphatic unsaturation. Again, it is desirable that $R^4$ be any monovalent hydrocarbon radical given previously for the $R^6$ radical of the polymer of Formula (1) with the exception of aliphatically unsaturated radicals for the same reasons given with respect to the hydride resins. Again, some of the $R^4$ radicals can be fluoroalkyl radicals of 3 to 8 carbon atoms such as 3,3,3-trifluoropropyl. The symbol t can be equal to 0 such that there is no hydride in the polymer chain so that the polymer can be simply hydride terminated. Further, it can have hydride radicals in the polymer chain as well as on the terminal positions of the polymer chain. The hydride polymers can be obtained by methods well known in the art, and generally comprise the hydrolysis of the appropriate chlorosilanes in water and then purifying the resulting linear polymer. Such methods are well known in the art and will not be gone into in detail here. Suffice it to state that what is important in the hydride polysiloxane copolymer given above is that it have the appropriate hydride concentration if it is to result in a cured elastomer having the desired physical properties. Accordingly, the most important property in all these hydrides that are disclosed above that may be utilized as cross-linking agents, is that the hydride cross-linking agent have the desired hydride as disclosed previously, and which is generally in the range of 0.2 to 1.0 percent by weight.

The third necessary ingredient in the composition of the instant case is that there be present from 1 to 200 ppm of a platinum catalyst. Here the platinum catalyst which may be utilized in the present composition may be platinum deposited on a solid carrier such as platinum on charcoal or platinum on gamma-alumina or it may be a solubilized platinum complex. The solubilized platinum complexes are preferred in the present composition since they are more reactive.

Preferred platinum catalysts are those platinum compound catalysts which are soluble in the present reaction mixture. The platinum compound can be selected from those having the formula $(PtCl_2.Olefin)_2$ and $H(PtCl_3.Olefin)$ as described in U.S. Pat. No. 3,159,601, Ashby. The olefin shown in the previous two formulas can be almost any type of olefin but is preferably an alkenylene having from 2 to 8 carbon atoms, a cycloalkenylene having from 5 to 7 carbon atoms or styrene. Specific olefins utilizable in the above formulas are ethylene, propylene, the various isomers of butylene, octylene, cyclopentene, cyclohexane, cycloheptane, etc.

A further platinum containing material usable in the composition of the present invention is the platinum chloride cyclopropane complex $(PtCl_2.C_3H_6)_2$ described in U.S. Pat. No. 3,159,662, Ashby.

Still further, the platinum containing material can be a complex formed from chloroplatinic acid with up to 2 moles per gram of platinum of a member selected from the class consisting of alcohols, ethers, aldehydes and mixtures of the above as described in U.S. Pat. No. 3,220,972, Lamoreaux.

The preferred platinum compound to be used not only as a platinum catalyst but also as a flame retardant additive is that disclosed in U.S. Pat. No. 3,775,452, Karstedt. Generally speaking, this type of platinum complex is formed by reacting chloroplatinic acid containing 4 moles of water of hydration with tetravinylcyclotetrasiloxane in the presence of sodium bicarbonate in an ethanol solution.

It should be noted that the Karstedt platinum catalyst is a solubilized platinum complex of platinum with a linear low molecular weight, vinyl-terminated polysiloxane polymer. On the other hand, another preferred catalyst that may be utilized is that disclosed in Modic U.S. Pat. No. 3,516,946, which comprises a complex formed between platinum and a vinyl-containing cyclopolysiloxane such as methylvinylcyclotetrasiloxane. The most preferred catalyst is the Karstedt and Lamoreaux catalysts as disclosed in the foregoing patents which are incorporated by reference. Another preferred catalyst is that disclosed in Willing U.S. Pat. No. 3,419,593. Generally, the most reactive type of platinum complexes are those disclosed in Karstedt, Lamoreaux, Willing and Modic patents which are generally most desirable in the compositions in the instant case since they give the most rapid cure rates as the inhibitor decomposes and the most consistently reproducible good physical properties in the final composition.

These are three of the most necessary ingredients in the present composition, that is the vinyl polymer, the hydride polysiloxane cross-linking agent, and the platinum catalyst. These ingredients by themselves will result in compositions that form silicone elastomers.

The invention of the instant case lies in the utilization of particular fillers with such compositions as defined above. That is, a filler that will result in the desired Elongation and Durometer in the final cured composition. Accordingly, the invention of the instant case lies in the novel combination with the above ingredients of 10 to 50 parts by weight of fumed silica with from 5 to 50 parts by weight of calcined diatomaceous earth. More preferably, there is utilized 10 to 25 parts by weight of fumed silica with 10 to 30 parts by weight of calcined diatomaceous earth. These ingredients must be utilized in the above concentrations if the composition is to have the desired end physical properties in the cured state. Desired physical properties in the cured state are a Tensile Strength of above 800 psi, a Durometer of above 60, and preferably in the range of 65 to 70 Durometer Hardness, an Elongation above 200% and a Tear above 100 pi. The two most desirable properties are Durometer and Elongation for electrical connectors, that is, the Durometer of the composition must be above 60, and the Elongation must be above 200%. The values for these properties are given above are the ones that must be obtained prior to post-bake of the molded parts.

Another way of measuring the preferred properties of the composition is such that the molded part passes what is known as the "pin test." Such a pin test comprises putting pins with weights on them into the molded part and if the molded part has sufficient Modulus, then the pin will not fall out of the molded part. This test was devised to measure the desired Modulus; the Modulus being a combination of the properties of Tensile Strength and Elongation. It should be noted that the Tensile Strength of the composition can be simply increased by putting into it more fumed silica. However, it is undesirable to put too much fumed silica into the composition since the uncured viscosity of the composition will increase above the desired limits. Further, the Elongation of the cured composition will decrease with more fumed silica in the composition. Finally, it has been found by the incorporation of the diatomaceous earth and a fumed silica of a certain surface area, there is obtained a Tear above 100. That is, not only does the cured electrical connector have the proper Modulus, it is also tough. Another advantageous property obtained in the cured part by the utilization of the combination of fumed silica and diatomaceous earth of the instant case is the fact that the cured composition is non-abrasive to the mold. The diatomaceous earth also acts as a mold release agent such that the part easily pops out of the mold. Accordingly, the advantageous results of the instant composition are obtained by the above combination of fumed silica with diatomaceous earth. Preferably, the fumed silica is treated with cyclopolysiloxanes and/or silazanes, as disclosed in Lucas U.S. Pat. No. 2,938,009 and Smith U.S. Pat. No. 3,635,743. The desired combination of cyclopolysiloxanes and/or silazanes is desirable to treat fumed silica such that the cured physical properties are enhanced while decreasing the tendency of the fumed silica to increase the uncured viscosity of the composition. More fumed silica can be incorporated in the composition if the fumed silica is treated with cyclopolysiloxanes and/or silazanes before increasing the viscosity above a certain point than if the fumed silica is untreated. Accordingly, it is preferred that the fumed silica be treated.

The diatomaceous earth can also be treated but this is not necessary. It also should be pointed out that it is preferred that the fumed silica have a surface area that is in the area of 200 to 400 m$^2$/gram, while the calcined diatomaceous earth has a surface area that varies from 1 to 5 m$^2$/gram. As the surface area increases, the Tear Strength of the cured composition increases without significantly increasing the viscosity of the uncured composition. Tear Strength is important in the composition such that the part will not tear when it is removed from the mold as well as being necessary to result in a silicone molded part that is difficult to destroy. Accordingly, the invention of the instant case resides in the use of a particular combination of fillers with an SiH-olefin platinum catalyzed composition as disclosed previously; that is, the three ingredients of the vinyl polymer, a hydride cross-linking agent, and platinum catalyst. It should be noted that although these fillers have been disclosed previously for use in SiH-olefin platinum catalyzed compositions, they have not been disclosed in the foregoing concentration ranges and combination as disclosed above to result in a liquid injection molding machine composition which will have the above properties; that is, an Elongation of at least 200% and a Durometer Hardness of at least 60 along with a Tear that is above 100 pi and a Tensile Strength that is above 800 psi. The percent Elongation is important in that it helps determine the Modulus of the composition. Further, the composition can take the necessary abuse; that is if it has a Durometer of above 60, it can take the necessary abuse as an electrical connector without rupturing. In this respect Tear Strength is also important. The property that is most easily effected is Tensile Strength since that can be increased by merely incorporating more fumed silica into the composition. However, the present invention lies in the formulation of a composition that has the desired other properties and in addition has a Tensile Strength of 800 psi.

It should be noted that these properties cannot be obtained by the utilization of plasticizers in an SiH-olefin composition since such plasticizers although they will increase the Elongation of the composition, they will not increase the Tear or the Durometer of the composition, to the desired level. Further, plasticizers undesirably affect the Tensile Strength of the composition. By plasticizers, it is meant the traditional plasticizers in silicone compositions such as for instance linear diorganopolysiloxane polymers of low viscosity, that is, a viscosity in the range of 100 to 10,000 centipoise at 25° C. Accordingly, the novelty in the instant composition lies in the novel combination of certain fillers at certain concentrations that produce a cured silicone elastomer with the desired physical properties—the two most important being Elongation and Hardness. Further, the silicone composition has a viscosity in the uncured state that does not exceed a certain limit. The cured composition also has good mold release.

In the composition there may also be incorporated an oganopolysiloxane copolymer vinyl-containing resin. Such vinyl-containing resins enhance the physical properties of the composition without unduly increasing the viscosity of the uncured composition. Accordingly, per 100 parts of the vinyl polymer, there may be present from 20 to 50 parts by weight of an organopolysiloxane copolymer comprising $R_3SiO_{0.5}$ units and $SiO_2$ units where R is a member selected from the class consisting of vinyl radicals and monovalent hydrocarbon radicals free of aliphatic unsaturation where the ratio of monofunctional units to tetrafunctional units is from about 0.5 to 1 to 1 to 1 and where there is from about 0.002 to 10 mole percent of vinyl groups.

The resin can also be one that contains difunctionalsiloxy units since, for instance, there may be present in the composition from 20 to 50 parts by weight of an organopolysiloxane copolymer comprising $R_3'SiO_{0.5}$ units and $SiO_2$ units and $R_2'SiO$ units; where R' is a group selected from the class consisting of vinyl radicals and monovalent hydrocarbon radicals free of aliphatic unsaturation where the ratio of $R_3'SiO_{0.5}$ units to the $SiO_2$ units is between 0.5 to 1 to 1 to 1 and $R_2'SiO$ units are present in amounts equal to from about 1 to 10 mole percent based on the total number of moles of siloxane units in the copolymer. The vinyl concentration of the copolymer varies from 0.002 to 10 mole percent. For more information as to the method of producing and using such polymers in SiH-olefin platinum compositions, one is referred to the disclosure of U.S. Pat. No. 3,436,366. Such vinyl resins in general are produced by the hydrolysis of the appriate chlorosilanes and the purification thereof.

Finally, the composition must contain an inhibitor. The purpose of the inhibitor is to give the composition some shelf life and work life prior to curing. Thus an inhibitor is incorporated in the composition and the composition is mixed and stored as such. When it is desired to cure the composition, the composition is heated at temperatures above 100° C. where the composition will cure in a matter of minutes or even seconds to a silicone elastomer in the case of liquid injection molding compositions. It should be noted that when the vinyl polysiloxane, the hydride polysiloxane and the platinum catalyst are mixed in the absence of an inhibitor, the composition cures at room temperature in about 1 to 24 hours with final cure taking place in seventy-two hours or it cures at elevated temperatures in a matter of seconds. By incorporating an inhibitor in the composition, the three ingredients may be mixed together and the composition can be utilized as such at room temperature without curing. However, upon heating the composition at elevated temperatures, that is temperatures above 100° C., the inhibitor decomposes and the composition cures to a silicone elastomer.

Some inhibitors are more effective than others. Accordingly, in the past it has been the practice to package the SiH-olefin platinum catalyzed compositions in two packages; that is, one containing the vinyl ingredient, the other containing the hydride ingredient and the platinum being in one of the packages—without any one package containing all three ingredients together. The fillers in the instant case can be placed in either package and are most desirably incorporated in the vinyl-containing polysiloxane. Accordingly, the compositions are packaged as such and when it is desired to utilize the composition, the two packages are mixed whereupon the composition will have a certain work life at room temperature prior to curing. There are certain inhibitors such as the hydroperoxide inhibitors of U.S. Pat. No. 4,061,609 which are so effective that the composition can be packaged as a single package for a period of time as long as six months to a year without curing, but will cure at elevated temperatures in a matter of seconds. However, this type of inhibitor is exceptionally effective, and most inhibitors are not as efficient. Accordingly, most inhibitors are utilized such that the composition is packaged in two packages as stated previously and then mixed together at room temperature with the inhibitor being present so as to give the composition a certain amount of work life; the curing of the composition taking place at elevated temperatures. Accordingly, there may be present per 100 parts of vinyl polymer at least 0.001 parts by weight of an inhibitor selected from the class consisting of acetylenic alcohols as disclosed in Kookootsedes U.S. Pat. No. 3,445,420 hydroperoxide containing compounds as disclosed in Bobear U.S. Pat. No. 4,061,609 alkenyl maleates as disclosed in the patent of R. Ekberg, U.S. Pat. No. 4,256,870, and alkenylisocyanurates as disclosed in Hardman, U.S. Pat. No. 3,882,083, and mixtures thereof as is desired.

It should be noted that mild inhibitors such as methylvinylcyclotetrasiloxanes can be utilized. However, such methylvinylcyclotetrasiloxanes are not very effective as inhibitors, and are utilized only when it is desired to have a mild inhibitor. Accordingly, the more preferred inhibitor is one of the ones recited previously; the most effective being the hydroperoxide-containing compound.

It should be noted that the concentrations are given as a guide and each concentration of the particular inhibitor that is utilized will depend on the type of inhibitor that is used as well as the desired inhibiting properties. Inhibitors are generally mixed with either the hydride resin or the vinyl polymer, most preferably with the hydride resin and the platinum catalyst if the composition is packaged in two packages. If it is packaged in one package, then, of course all the ingredients are in one single package. Normally, the composition is packaged in two packages and when it is desired to utilize the composition, the packages are mixed and allowed to lie at room temperature until they are ready to be utilized. Upon being injected into the liquid injection mold and being heated at temperatures above 100° C., the composition of the instant case will cure to a silicone elastomer in a matter of seconds.

The examples below are given for the purpose of illustrating the present invention. They are not given for any purpose of setting metes and boundaries to the instant invention. All parts in the examples are by weight.

In all the examples below, the composition or molded part was post-cured for two hours. It is normal to post-cure the composition for two hours so as to complete the cure of the composition. The preferred values that have been given previously are for compositions that have not been post-cured. The desired post-cured properties are those that result from compositions that have the initial properties outlined above and that are cured for 2 hours with the properties that result therefrom.

EXAMPLE 1

There was prepared a Composition A having 75 parts by weight of an 80,000 centipoise at 25° C. vinyldimethyl chain-stopped polydimethylsiloxane polymer which had 0.02 mole percent vinyl mixed with 25 parts by weight of a resin having monofunctional siloxy units, difunctional siloxy units and tetrafunctional siloxy units where the vinyl concentration of the resin was 0.07 mole percent and in which the ratio of the monofunctional units to tetrafunctional units to difunctional siloxy units was 0.7 to 1.0 to 0.17 and the resin had 0.02 mole percent vinyl. To 100 parts of this mixture there was added 18 parts of fumed silica treated initially with octamethylcyclotetrasiloxane, followed by hexamethyldisilazane, 25 parts of crushed quartz, 0.059 parts of Lamoreaux's platinum catalyst as disclosed in the foregoing Lamoreaux patent, 0.052 parts of diallyl maleate, 3.6 parts of a hydride coupler composed of $H(CH_3)_2SiO)_{0.5}$ and $SiO_2$ units where the ratio of monofunctional to tetrafunctional units was 2 to 1, and the hydride content of the resin was 0.82 percent by weight. The mixture had a viscosity of 912,000 centipoise at 25° C.

There was prepared a Composition B comprising 100 parts by weight of the vinyl polymer and vinyl resin as outlined in Composition A, 18 parts of the treated fumed silica as outlined in Composition A, 25 parts of calcined diatomaceous earth, 0.059 parts of Lamoreaux's platinum catalyst as defined in the Lamoreaux patent, 0.052 parts of diallyl maleate, 3.6 parts by weight of the same hydride resin as disclosed in Composition A. The resulting composition in the uncured state had a viscosity of 1,070,000 centipoise at 25° C. Composition A and B when cured as outlined below had the physical properties disclosed in Table I.

TABLE I

|  | Composition A | | Composition B | |
| --- | --- | --- | --- | --- |
|  | 15 Min. 350° F. | Post-Cured 2 hrs. 400° F. | 15 Min. 250° F. | Post-Cured 2 hrs. 400° F. |
| Shore A, Hardness | 45 | 64 | 63 | 72 |
| % Elongation | 580 | 300 | 500 | 220 |
| Tensile Strength, psi | 931 | 956 | 838 | 998 |
| Tear Strength, pi (Die B) | 134 | 111 | 131 | 105 |

As the results shown, Composition B having the diatomaceous earth in it was as good as, if not superior in physical properties to Composition A having the crushed quartz in it.

EXAMPLE 2

A Composition C was prepared comprising 100 parts of a blend of 75 parts by weight of an 80,000 centipoise at 25° C. vinyldimethyl terminated polydimethylsiloxane polymer and 25 parts of a vinyl resin composed of monofunctional siloxy units, difunctional siloxy units, and tetrafunctional siloxy units having 0.07 mole percent vinyl content of Example 1. To this mixture there was added 18 parts treated fumed silica as outlined in Composition A, 25 parts of diatomaceous earth, 0.059 parts of Lamoreaux's platinum catalyst and 3.3 parts of the hydride resin of Example 1. The resulting uncured composition had a viscosity of 1,100,000 centipoise at 25° C. There was prepared a Composition D which had the same ingredients as Composition C except there was utilized 3.6 parts by weight of the hydride resin of Example 1. The resulting compositions which were cured under the conditions shown had the physical properties listed in Table II.

TABLE II

|  | Composition C | | Composition D | |
|---|---|---|---|---|
|  | 6 Min. 400° F. | Post-Cured 2 Hrs. 400° F. | 6 Min. 400° F. | Post-Cured 2 hrs. 400° F. |
| Shore A, Hardness | 66 | 67 | 67 | 70 |
| % Elongation | 430 | 250 | 400 | 250 |
| Tensile Strength, psi | 900 | 1000 | 870 | 1008 |
| Tear Strength, pi (Die B) | 154 | 120 | 157 | 112 |

As the results of Table II show, Compositions C and D had excellent physical properties.

EXAMPLE 3

There was prepared a Composition E and F comprising 100 parts by weight of the same blend of vinyl-containing linear polymer and vinyl resin as in Examples 1 and 2, 18 parts of hexamethyldisilazane treated fumed silica having a surface area of 200 m²/gram, 0.059 parts of Lamoreaux's platinum catalyst, 0.052 parts diallyl maleate and 3.3 parts of the hydride resin cross-linking agent of Example 1. The resulting mixed composition in the uncured state had a viscosity at 25° C. of 1,100,000 centipoise at 25° C. There was then prepared a Composition F which was the same composition as Composition E except there was utilized 3.6 parts by weight of the hydride resin cross-linking agent of Example 1 and the composition in the uncured state had a viscosity of 1,000,000 centipoise at 25° C. The resulting cured composition, cured as set forth in Table III, had the properties listed in Table III.

TABLE III

|  | Composition E | | Composition F | |
|---|---|---|---|---|
|  | 6 Min. 400° F. | Post-Cured 2 hrs. 400° F. | 6 Min. 400° F. | Post-Cured 2 Hrs. 400° F. |
| Shore A, Hardness | 68 | 71 | 69 | 72 |
| % Elongation | 400 | 250 | 400 | 250 |
| Tensile Strength, pi | 884 | 1056 | 895 | 1096 |
| Tear Strength, pi (Die B) | 163 | 126 | 192 | 117 |

EXAMPLE 4

There was prepared Compositions G and H; Composition G comprising 100 parts by weight of the same vinyl blend of vinyl-terminated polymer and vinyl-containing resin as Example 1, 18 parts by weight of hexamethyldisilazane treated fumed silica having a surface area of 300 m²/gram, 25 parts of calcined diatomaceous earth filler, 0.059 parts of Lamoreaux's catalyst, 0.0525 parts of diallyl maleate and 3.3 parts of the hydride resin cross-linking agent of Example 1. There was prepared a Composition H which had the same concentrations of the same ingredients as Composition G except there was utilized 3.6 parts by weight of the hydride resin cross-linking agent of Example 1. The resulting compositions were cured. The properties of the cured compositions as well as the conditions under which they were cured are set forth in Table IV below.

TABLE IV

|  | Composition G | | Composition H | |
|---|---|---|---|---|
|  | 6 Min. 400° F. | Post-Cured 2 Hrs. 400° F. | 6 Min. 400° F. | Post-Cured 2 Hrs. 400° F. |
| Shore A, Hardness | 68 | 70 | 70 | 70 |
| % Elongation | 330 | 200 | 280 | 130 |
| Tensile Strength, psi | 749 | 898 | 747 | 838 |
| Tear Strength, pi (Die B) | 159 | 138 | 170 | 128 |

As the results of Table IV indicate, the tear of this composition was exceptionally high as well as Durometer without too great a sacrifice in Elongation and Tensile Strength. The reason for the high tear was the high surface area of fumed silica that was utilized.

EXAMPLE 5

There was prepared Compositions I and J. Composition I comprised 100 parts by weight of the blend of vinyl-terminated linear polymer and vinyl resin of Example 1 and the other examples, 18 parts by weight of a hexamethyldisilazane-treated fumed silica having a surface area of 400 m²/gram, 25 parts of calcined diatomaceous earth, 0.059 parts of Lamoreaux's platinum catalyst, 0.052 parts of diallyl maleate, 3.3 parts of the hydride resin cross-linking agent of Example 1. The uncured composition had a viscosity of 25° C. of 1,100,000. There was prepared a Composition J which was the same as Composition I in terms of ingredients and concentration of ingredients except there was utilized in the composition 3.6 parts by weight of the hydride cross-linking agent of Example 1 and of Composition I. The resulting uncured composition had a viscosity of 1,000,000 centipoise at 25° C. The conditions of cure of Composition I and J as well as the properties after cure and post-cure are indicated in Table V below.

TABLE V

|  | Composition I | | Composition J | |
|---|---|---|---|---|
|  | 6 Min. 400° F. | Post-Cured 2 Hrs. 400° F. | 6 Min. 400° F. | Post-Cured 2 Hrs. 400° F. |
| Shore A, Hardness | 65 | 68 | 66 | 68 |
| % Elongation | 420 | 330 | 423 | 250 |
| Tensile Strength, psi | 748 | 850 | 757 | 928 |

TABLE V-continued

| | Composition I | | Composition J | |
|---|---|---|---|---|
| | 6 Min. 400° F. | Post-Cured 2 Hrs. 400° F. | 6 Min. 400° F. | Post-Cured 2 Hrs. 400° F. |
| Tear Strength, pi (Die B) | 167 | 153 | 166 | 141 |

As the results of Table V show, there is obtained a cured composition of high Tear Strength with a small drop in Tensile Strength when there is utilized the highest surface area of fumed silica, that is 400 m²/gram. The Elongation does not increase that much over previous tested compositions. Accordingly, it is within the scope of the instant invention that by utilizing a very high surface area fumed silica, in combination with calcined diatomaceous earth, that there is obtained a cured silicone elastomer of exceptionally high Tear strength and with good percent Elongation even after post-cure and a Durometer hardness of at least 60 and an acceptable Tensile Strength. This is in addition to the other advantages noted previously for the novel combination of fillers of the instant invention in an SiH-olefin platinum catalyzed composition as disclosed above. Other variations within the instant invention so as to obtain desired properties in one area or another is self-evident and can be obtained by manipulating the various concentrations of the fillers within the ranges shown above, and is well within the capability of a worker skilled in the art.

What is claimed is:

1. A silicone rubber composition which in the uncured state does not have a viscosity that exceeds $1.5 \times 10^6$ centipoise at 25° C. and has a Durometer in the cure state that exceeds 60 comprising:
    (A) 100 parts by weight of a linear vinyl terminated diorganopolysiloxane polymer having a viscosity that is in the range of 100 to 100,000 centipoise at 25° C. where the organo group is a monovalent hydrocarbon radical and the vinyl content varies from 0.05 to 0.20 weight percent;
    (B) from 10 to 50 parts by weight of fumed silica;
    (C) from 5 to 50 parts by weight of calcined diatomaceous earth;
    (D) from 1 to 200 parts per million of platinum as a platinum catalyst; and
    (E) from 1 to 50 parts by weight of a hydride-containing organopolysiloxane cross-linking agent wherein the hydrogen content varies from 0.2 to 1.0 percent by weight where the organo group is a monovalent hydrocarbon radical.

2. The composition of claim 1 wherein there is further present from 20 to 50 parts by weight of an organopolysiloxane copolymer comprising $(R)_3SiO_{0.5}$ units and $SiO_2$ units where R is a member selected from the class consisting of vinyl radicals and monovalent hydrocarbon radicals free of aliphatic unsaturation and where the ratio of monofunctional units to tetrafunctional units is from about 0.5 to 1 to 1 to 1 and where there is from about 0.002 to 10 mole percent of vinyl groups.

3. The composition of claim 1 wherein there is further present from 20 to 50 parts by weight of an organopolysiloxane copolymer comprising $(R')_3SiO_{0.5}$ units, $SiO_2$ units and $R_2'SiO$ units where R' is a group selected from the class consisting of vinyl radicals and monovalent hydrocarbon radicals free of aliphatic unsaturation where the ratio of $(R')_3SiO_{0.5}$ units to the $SiO_2$ units is between 0.5 to 1 to 1 to 1 and the $(R')_2SiO$ units are present in an amount equal to from about 1 to 10 mole percent based on the total number of mole percent of siloxane units in the copolymer and the vinyl concentration in the copolymer varies from 0.002 to 10.0 percent.

4. The composition of claim 2 wherein the fumed silica is treated with cyclopolysiloxanes prior to being incorporated in the composition.

5. The composition of claim 4 wherein the fumed silica is treated with silazanes and is present at a concentration of 10 to 25 parts by weight.

6. The composition of claim 5 wherein the diatomaceous earth is present at a concentration of 10 to 30 parts by weight.

7. The composition of claim 6 wherein the platinum catalyst is solubilized platinum complex.

8. The composition of claim 7 wherein the platinum catalyst is platinum complexed with an aliphatic alcohol.

9. The composition of claim 7 wherein the platinum catalyst is platinum complexed with a vinyl-containing cyclopolysiloxane.

10. The composition of claim 7 wherein the platinum catalyst is platinum complexed with a low molecular weight linear vinyl-terminated polysiloxane.

11. The composition of claim 8 wherein the hydride organopolysiloxane is a resinous copolymer having

units and $SiO_2$ units where the $H+R^2$ to Si ratio varies from 1.0 to 2.7 where $R^2$ is a monovalent hydrocarbon radical free of aliphatic unsaturation.

12. The composition of claim 8 wherein the hydride organopolysiloxane is a resinous copolymer having

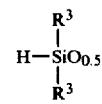

units and $SiO_2$ and $R_2{}^3SiO$ units where the $H+R^3$ to Si ratio varies from 1.2 to 2.7 and where $R^3$ is a monovalent hydrocarbon radical free of aliphatic unsaturation.

13. The composition of claim 8 wherein the hydride organopolysiloxane is a linear copolymer having the formula

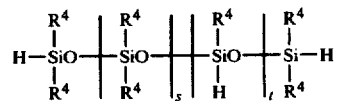

where t is 0 or an integral number and s, t vary such that viscosity of the polymer varies from 10 to 1,000 centipoise at 25° C. and $R^4$ is a monovalent hydrocarbon radical free of aliphatic unsaturation.

14. The composition of claim 13 wherein the linear vinyl-terminated polysiloxane has the formula

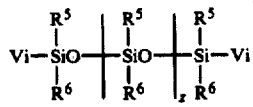

where Vi is vinyl, $R^6$ is a monovalent hydrocarbon radical and $R^5$ is a monovalent hydrocarbon radical free of aliphatic unsaturation and z varies such that the viscosity of the polymer varies from 100 to 100,000 centipoise at 25° C.

15. The composition of claim 14 wherein there is present at least 0.001 parts by weight of an inhibitor selected from the class consisting of acetylenic alcohols, hydroperoxide containing compounds, alkenyl-containing maleates, alkenyl isocyanurates and mixtures thereof.

16. A process for forming a silicione rubber composition which in the uncured state does not have a viscosity that exceeds $1.5 \times 10^6$ centipoise at 25° C. and has a Durometer in the cured state that exceeds 60 comprising: (1) mixing
(A) 100 parts by weight of a linear vinyl terminated diorganopolysiloxane polymer having a viscosity that is in the range of 100 to 100,000 centipoise at 25° C. where the organo group is a monovalent hydrocarbon radical and the vinyl content varies from 0.05 to 0.20 weight percent;
(B) from 10 to 50 parts by weight of fumed silica;
(C) from 5 to 50 parts by weight of calcined diatomaceous earth;
(D) from 1 to 200 parts per million of platinum as a platinum catalyst; and
(E) from 1 to 50 parts by weight of a hydride organopolysiloxane cross-linking agent wherein the hydrogen content varies from 0.2 to 1.0 percent by weight where the organo group is a monovalent hydrocarbon radical;
and (2) heating the composition so as to allow the composition to cure to a silicone elastomer.

17. The process of claim 16 where there is further present from 20 to 50 parts by weight of an organopolysiloxane copolymer comprising $(R)_3SiO_{0.5}$ units and $SiO_2$ units where R is a member selected from the class consisting of vinyl radicals and monovalent hydrocarbon radicals free of aliphatic unsaturation and where the ratio of monofunctional units to tetrafunctional units is from about 0.5 to 1 to 1 to 1 and where there is from about 0.002 to 10 mole percent of vinyl groups.

18. The process of claim 16 where there is further present from 20 to 50 parts by weight of an organopolysiloxane copolymer comprising $(R')_3SiO_{0.5}$ units, $SiO_2$ units, $R_2'SiO$ units, where R' is a group selected from the class consisting of vinyl radicals and monovalent hydrocarbon radicals free of aliphatic unsaturation where the ratio of $(R')_3SiO_{0.5}$ units to the $SiO_2$ units is between 0.5 to 1 to 1 to 1 and $(R')_2SiO$ units are present in an amount equal to from about 1 to 10 mole percent based on the total number of mole percent of siloxane units in the copolymer and the vinyl concentration in the copolymer varies from 0.002 to 10.0 mole percent.

19. The process of claim 17 wherein the fumed silica is treated with cyclopolysiloxane prior to being incorporated in the process.

20. The process of claim 19 wherein the fumed silica is treated with silazanes and is present at a concentration of 10 to 25 parts by weight.

21. The process of claim 20 wherein the diatomaceous earth is present in a concentration of 10–30 parts by weight.

22. The process of claim 21 wherein the platinum catalyst is a solubilized platinum catalyst.

23. The process of claim 22 wherein the platinum catalyst is platinum complexed with an aliphatic alcohol.

24. The process of claim 22 wherein the platinum catalyst is platinum complexed with a vinyl-containing cyclopolysiloxane.

25. The process of claim 22 wherein the platinum catalyst is platinum complexed with a low molecular weight linear vinyl-terminated polysiloxane.

26. The process of claim 23 wherein the hydride organopolysiloxane is a resinous copolymer having

units and $SiO_2$ units where the $H + R^2$ to Si ratio varies from 1.0 to 2.7 where $R^2$ is a monovalent hydrocarbon radical free of aliphatic unsaturation.

27. The process of claim 23 wherein the hydride organopolysiloxane is a resinous copolymer having

units and $SiO_2$ and $R_2^3 SiO$ units where the $H + R^3$ to Si ratio varies from 1.2 to 2.7 and where $R^3$ is a monovalent hydrocarbon radical free of aliphatic unsaturation.

28. The process of claim 23 wherein the hydride organopolysiloxane is a linear copolymer having the formula

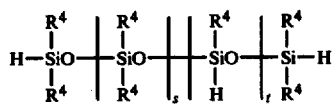

where t is 0 or an integral number and s, t vary such that viscosity of the polymer varies from 10 to 1,000 centipoise at 25° C. and $R^4$ is a monovalent hydrocarbon radical free of aliphatic unsaturation.

29. The process of claim 28 wherein the linear vinyl-terminated polysiloxane has the formula

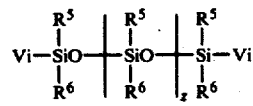

where Vi is vinyl, $R^6$ is a monovalent hydrocarbon radical and $R^5$ is a monovalent hydrocarbon radical free of aliphatic unsaturation and z varies such that the viscosity of the polymer varies from 100 to 100,000 centipoise at 25° C.

30. The process of claim 29 wherein there is present at least 0.001 parts by weight of an inhibitor selected from the class consisting of acetylenic alcohols, hydroperoxide-containing compounds, alkenyl-containing maleates, alkenyl isocyanurates and mixtures thereof.

31. The process of claim 30 wherein the composition is formed into a part, in a liquid injection molding machine of the plunger type.

32. The process of claim 30 wherein the composition is heated to cure it to a silicone elastomer in a reciprocating screw type of liquid injection molding machine.

33. A process for forming a silicone elastomeric part which has a Durometer in the cure state that exceeds 60 and an Elongation that exceeds 200% and which in the silicone composition in the uncured state has a viscosity that does not exceed $1.5 \times 10^6$ centipoise at 25° C., comprising (1) passing into a liquid injection molding machine a silicone composition having:
  (A) 100 parts by weight of a linear vinyl terminated diorganopolysiloxane polymer having a viscosity that is in the range of 100 to 100,000 centipoise at 25° C. where the organo group is a monovalent hydrocarbon radical and the vinyl content varies from 0.05 to 0.20 weight percent;
  (B) from 10 to 50 parts by weight of fumed silica;
  (C) from 5 to 50 parts by weight of calcined diatomaceous earth;
  (D) from 1 to 200 parts per million of platinum as a platinum catalyst; and
  (E) from 1 to 50 parts by weight of a hydride organopolysiloxane cross-linking agent wherein the hydrogen content varies from 0.2 to 1.0 percent by weight where the organo group is a monovalent hydrocarbon radical;
(2) heating the above composition in the liquid injection molding machine so as to form an elastomeric part; and
(3) ejecting the formed part from the liquid injection molding machine.

34. The process of claim 33 wherein the liquid injection molding machine is a plunger type of liquid injection molding machine.

35. The process of claim 33 wherein the liquid injection molding machine is a reciprocating screw type of liquid injection molding machine.

36. The process of claim 35 wherein there is further present from 20 to 50 parts by weight of an organopolysiloxane copolymer comprising $(R)_3SiO_{0.5}$ units and $SiO_2$ units where R is a member selected from the class consisting of vinyl radicals and monovalent hydrocarbon radicals free of aliphatic unsaturation and where the ratio of monofunctional units to tetrafunctional units is from about 0.5 to 1 to 1 to 1 and where there is from about 0.002 to 10 mole percent of vinyl groups.

37. The process of claim 35 wherein in the silicone composition there is further present from 20 to 50 parts by weight of an organopolysiloxane copolymer comprising $(R')_3SiO_{0.5}$ units, $SiO_2$ units, and $R_2'SiO$ units where R' is a group selected from the class consisting of vinyl radicals free of aliphatic unsaturation where the ratio of $(R')_2SiO$ units are present in an amount equal to from about 1 to 10 mole percent based on the total number of moles of siloxane units in the copolymer and the vinyl concentration in the copolymer varies from 0.002 to 10.0 mole percent.

38. The process of claim 36 wherein the fumed silica is treated with cyclopolysiloxanes prior to being incorporated in the composition.

39. The process of claim 38 wherein the fumed silica is treated with silazanes and is present at a concentration of 10 to 25 parts by weight.

40. The process of claim 39 wherein the diatomaceous earth is present in a concentration of 10 to 30 parts by weight.

41. The process of claim 40 wherein the platinum catalyst is a solubilized platinum complex.

42. The process of claim 41 wherein the platinum catalyst is platinum complexed with an aliphatic alcohol.

43. The process of claim 41 wherein the platinum catalyst is platinum complexed with a vinyl-containing cyclopolysiloxane.

44. The process of claim 41 wherein the platinum catalyst is platinum complexed with a low molecular weight linear vinyl-terminated polysiloxane 45. The process of claim 42 wherein the hydride organopolysiloxane is a resinous copolymer having

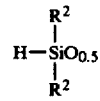

units and $SiO_2$ units where the $H+R^2$ to Si ratio varies from 1.0 to 2.7 where $R^2$ is a monovalent hydrocarbon radical free of aliphatic unsaturation.

46. The process of claim 42 wherein the hydride organopolysiloxane is a resinous copolymer having the formula

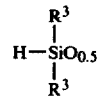

units and $SiO_2$ and $R_2{}^3SiO$ units where the $H+R^3$ to Si ratio varies from 1.2 to 2.7 and where $R^3$ is a monovalent hydrocarbon radical free of aliphatic unsaturation.

47. The process of claim 42 wherein the hydride organopolysiloxane is a linear copolymer having the formula

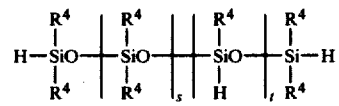

where t is 0 or an integral number and s, t vary such that viscosity of the polymer varies from 10 to 1,000 centipoise at 25° C. and $R^4$ is a monovalent hydrocarbon radical free of aliphatic unsaturation.

48. The process of claim 47 wherein the linear vinyl-terminated polysiloxane has the formula

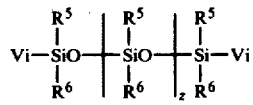

where Vi is vinyl, $R^6$ is a monovalent hydrocarbon radical and $R^5$ is a monovalent hydrocarbon radical free of aliphatic unsaturation and z varies such that the viscosity of the polymer varies from 100 to 100,000 centipoises at 25° C.

49. The process of claim 48 wherein there is present at least 0.001 parts by weight of an inhibitor selected from the class consisting of acetylenic alcohols, hydroperoxide containing compounds, alkenyl-containing maleates, alkenyl isocyanurates and mixtures thereof.

* * * * *